United States Patent [19]

Palac, deceased et al.

[11] Patent Number: 4,876,480
[45] Date of Patent: Oct. 24, 1989

[54] LOW-COST, SELF-POLISHED COLOR CRT FLAT FACEPLATE

[75] Inventors: Kazimir Palac, deceased, late of Carpentersville, Ill., by Phyllis J. Palac, heir; by Judith A. Palac, heir, East Lansing, Mich.; by Donald T. Palac, heir, North Ridgeville, Ohio; by Susan M. Palac, heir, River Forest, Ill.

[73] Assignee: Zenith Electronics Corporation, Glenview, Ill.

[21] Appl. No.: 212,111

[22] Filed: Jun. 24, 1988

Related U.S. Application Data

[63] Continuation of Ser. No. 947,787, Dec. 30, 1986, abandoned.

[51] Int. Cl.⁴ .................................... H01J 29/86
[52] U.S. Cl. ........................ 313/477 R; 313/408; 313/466; 220/2.1 A
[58] Field of Search ........... 313/408, 466, 461, 477 R; 220/2.1 A, 2.3 A

[56] References Cited

U.S. PATENT DOCUMENTS

| | | | |
|---|---|---|---|
| 3,615,328 | 10/1971 | Coleman | 65/72 |
| 4,432,464 | 2/1984 | Seats et al. | 313/364 X |
| 4,471,262 | 9/1984 | Tamura et al. | 313/466 |
| 4,651,051 | 3/1987 | Bloom et al. | 313/408 X |
| 4,671,814 | 6/1987 | Aratani et al. | 65/99.2 |
| 4,686,415 | 8/1987 | Strauss | 313/402 |
| 4,710,670 | 12/1987 | Daugherty et al. | 313/408 X |

*Primary Examiner*—Kenneth Wieder

[57] ABSTRACT

The use of a flat faceplate comprised of self-polished float glass substantially reduces the cost of a cathode ray tube incorporating a flat tensioned shadow mask while affording a high degree of video image acuity. The float glass flat faceplate does not require polishing and acid etching to provide a high degree of smoothness in its inner and outer surfaces and, in combination with a flat tensioned shadow mask mounted to the flat faceplate, offers a low cost, easily manufactured and assembled color CRT front assembly.

5 Claims, 2 Drawing Sheets

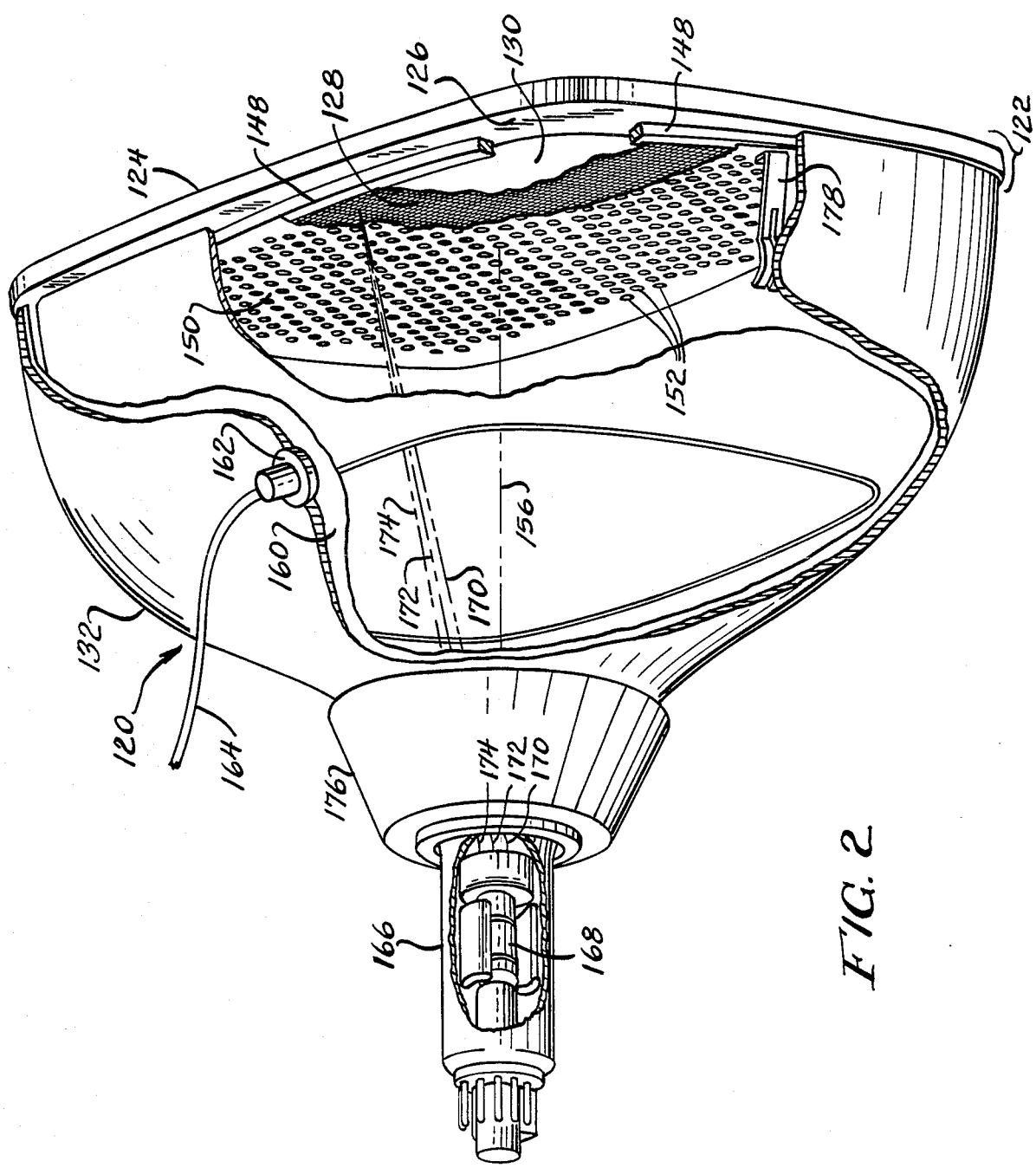

LOW-COST, SELF-POLISHED COLOR CRT FLAT FACEPLATE

This is a continuation of application Ser. No. 947,787, filed Dec. 30, 1986, now abandoned.

CROSS-REFERENCE TO RELATED APPLICATIONS

This application is related to but in no way dependent upon copending applications Ser. Nos. 832,559; 832,493; and 832,556; filed Feb. 21, 1986 and of common ownership herewith.

BACKGROUND OF THE INVENTION

This invention relates generally to cathode ray tubes (CRTs) and is particularly directed to a low cost flat faceplate and front assembly, and method of production therefor, for use in a color CRT having a flat tensioned shadow mask.

Most glass produced in the past has been in the form of sheet, window or drawn glass which is characterized as having two smooth or fire polished surfaces which typically require no further processing once produced. Over the years, this has been the most important type of flat glass for the construction industry and is used primarily for windows. This type of glass is initially formed as plate glass by drawing the glass vertically from a tank by means of a metal "bait", whereupon the glass is immediately contacted by cooled side-rollers to prevent it from flowing together and is then directed horizontally before entering an annealing lehr. The degree of flatness and parallelism achieved by thus rolling the malleable glass is of a relatively high standard, which is typically improved by optical methods such as grinding, polishing and acid etching.

Since the 1960s, however, sheet glass has increasingly been replaced by float glass which is manufactured by a process wherein the glass floats like an endless ribbon on a bath of molten tin to produce high quality glass having flat surface planes. Float glass has been used for glazing whenever transparency is required in buildings and is also used as a raw material for making safety glass, mirrors and otherwise finished or processed flat glass for furniture as well as for liquid crystal diode (LCD) displays.

Video displays such as CRTs have a glass construction which to date has not been amenable to either of the aforementioned glass production techniques. A CRT generally consists of an evacuated envelope having a neck portion, a faceplate, and a funnel portion therebetween. An electron gun disposed in the neck portion of the envelope emits energetic electrons which are directed onto the inner surface of the faceplate. Disposed on the inner surface of the faceplate are a large number of phosphor elements which glow momentarily when struck from the rear by electrons from the electron gun to produce a video image which is visible through the faceplate.

Prior art CRTs have generally been of the curved faceplate type wherein the faceplate is generally convex as seen by a viewer. The faceplate is initially formed in a pressing mold which typically includes a hollow mold into which a glass gob is deposited. The glass gob is then hydraulically or pneumatically pressed by a sealing ring-guided plunger until the glass is pressed into all areas of the mold and assumes the desired curvature. After solidification, the plunger is withdrawn and the solid glass faceplate is removed from the hollow mold. One example of a method of press shaping glass faceplates using a rotary press-molding machine is disclosed in U.S. Pat. No. 3,615,328 to Coleman. This method as well as other prior art approaches involves the stepwise, sequential fabrication of individual faceplates and requires long periods of pressing time and is thus lengthy and expensive.

Recent developments in video displays have led to a color CRT having a substantially flat faceplate and incorporating a shadow mask of the tensioned foil type which offers various advantages over the aforementioned prior art curved faceplate CRTs including improved brightness and/or contrast of the video image. Although not subjected to the curvature inducing sagging operation, flat faceplates for use in CRTs having flat tensioned shadow masks are also generally formed by the aforementioned pressing process. As a result, flat faceplates as in the case of the aforementioned curved CRT faceplates have not yet been amenable to low cost, simplified production techniques.

The commercial success of CRTs employing a substantially flat faceplate depends, in large part, upon the cost to manufacture this type of CRT. Much effort has thus been expended to reduce the cost of CRTs having a substantially flat faceplate and incorporating a shadow mask of the flat tensioned foil type. The present invention is the result of such efforts in that it contemplates a method of producing, as well as the composition of, a flat glass faceplate for a color CRT which substantially simplifies and reduces the cost of the faceplate, while providing a high degree of video image acuity.

OBJECTS OF THE INVENTION

Accordingly, it is an object of the present invention to provide a low cost flat faceplate for use in a color CRT.

It is another object of the present invention to reduce the cost of color CRTs having a flat tensioned shadow mask which offer high video image acuity.

A further object of the present invention is to provide a method of producing a flat faceplate for use in a color CRT which involves neither the grinding, polishing or acid etching of the faceplate.

A still further object of the present invention is to provide a low cost front assembly for a color CRT having a flat faceplate and a flat tensioned shadow mask mounted thereto.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

FIG. 2 is a partially cutaway perspective view of flat tensioned shadow mask CRT incorporating a flat faceplate in accordance with the present invention.

DETAILED DESCRIPTION OF THE PREFERRED EMBODIMENT

Figure 1:
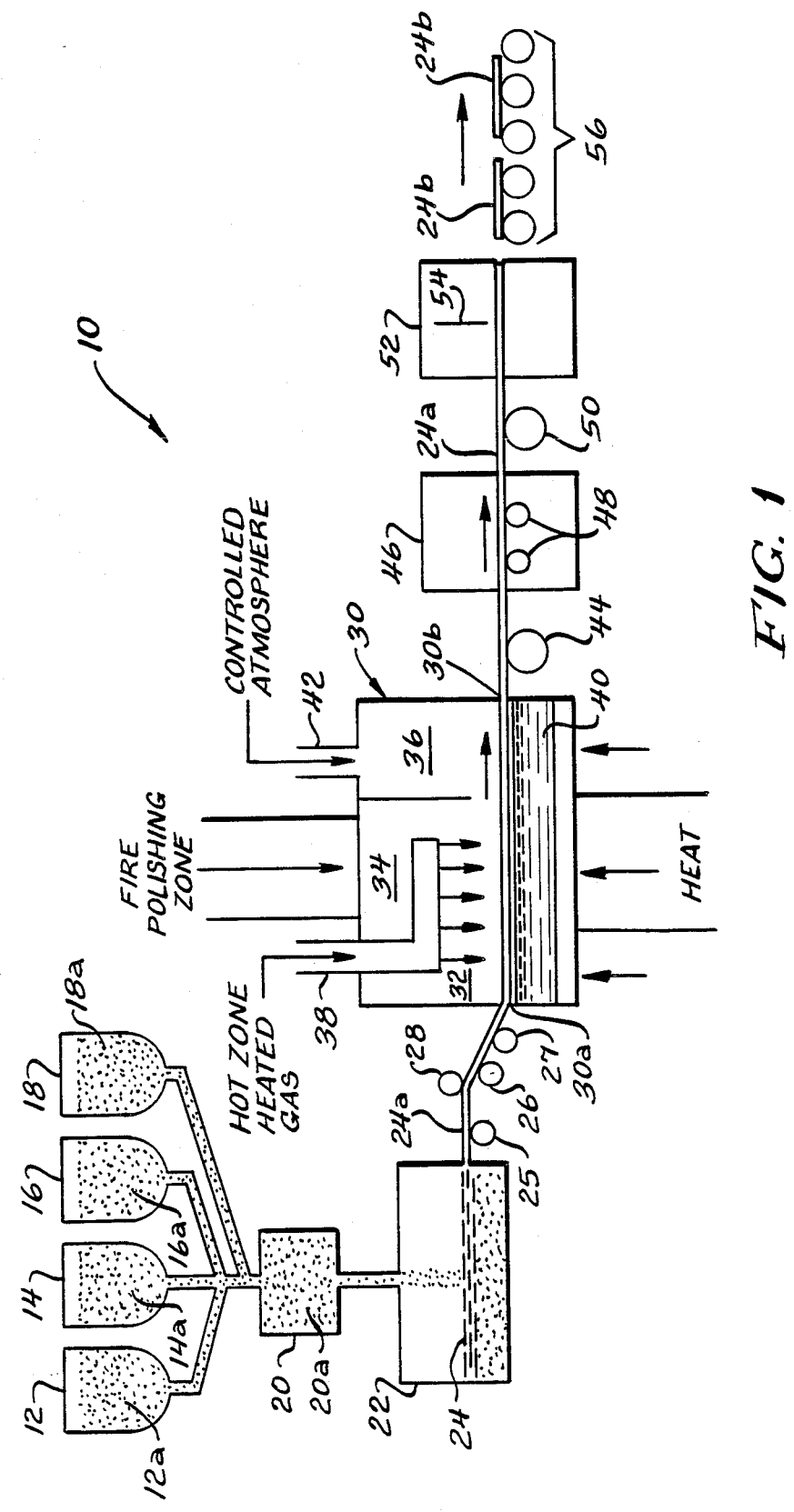
FIG. 1 is a simplified schematic diagram illustrating a float glass system for producing flat faceplates for color CRTs in accordance with the present invention.

Referring to FIG. 1, there is shown a simplified schematic diagram of a system 10 for fabricating flat glass faceplates for use in color CRTs in accordance with the present invention.

The flat faceplate manufacturing system 10 includes first, second, third and fourth supply reservoirs 12, 14, 16 and 18 which provide the raw materials from which flat faceplates in accordance with the present invention are made. Thus, the first supply reservoir 12 contains a quantity of sand 12a, the second supply reservoir 14 contains a supply of lime 14a, the third supply reservoir 16 holds a supply of soda 16a, and the fourth supply reservoir 18 contains an X-ray absorbing material 18a, such as barium oxide, lead oxide, or strontium oxide. The flat glass faceplate must contain a minimum amount of any of these heavy oxides to prevent the escape of X-rays produced in the CRT. Each of the supply reservoirs deposits its contents in the proper proportion into a feed hopper 20 in forming a glass frit mixture 20a therein. The proportions of the various components of the glass frit mixture 20a may vary depending upon the particular type of flat glass faceplate it is desired to produce. The specific proportions used for the various applications are well known to those skilled in the art and do not form a part of the present invention.

From the feed hopper 20, the glass frit mixture 20a is deposited into a glass melting tank 22 which is typically an oil-fired continuous tank furnace. The glass frit mixture 20a is reduced to a glassmelt 24 within the glass-melting tank 22 and emerges therefrom as a continuous glass band 24a. The continuous glass band 24a is directed onto and between a plurality of transport rollers 25, 26, 27 and 28. The transport rollers, in turn, direct the continuous glass band 24a through an inlet slot 30a in a float bath 30 which contains a pool of molten tin 40. The glass band 24a is positioned on the upper surface of the molten tin 40 and is heated from above in a heated zone 32 by appropriate combustible gases introduced into the float bath 30 via a hot gas inlet 38. The continuous glass band 24a is thus heated to a temperature which renders it fluid, so that it assumes the form of the plane-parallel film of the required thickness on the bath of molten tin 40. The tin is maintained in a molten state by heating it within the float bath 30 from below. The continuous glass band 24a floats like an endless ribbon on the molten tin 40 from the inlet slot 30a to an outlet slot 30b in the float bath 30.

Adjacent to the inlet slot 30a, where the glass first makes contact with the tin surface, the temperature of the molten metal is typically about 1000° C. At the outlet slot 30b of the float bath 30, the temperature is maintained at approximately 600° C. Because tin is a liquid at 600° C. and does not develop appreciable vaporization pressure at 1000° C., the molten tin 40 is able to support the glass band 24a and to allow it to flow through the float bath 30 in a continuous manner. The float bath 30 contains a fire polishing zone 34 wherein the surfaces of the glass band 24a assume a polished smoothness. To guard against oxidation of the molten tin 40 by atmospheric oxygen, which would degrade the transparency of the produced glass, the tin bath is maintained in a weakly reducing, carefully controlled protective gas by means of a controlled atmosphere zone 36 within the float bath 30. Once past the heated zone 32, the gas flows through the controlled atmosphere zone 36 and is discharged from the float bath 30 via the outlet slot 30b in the form of a solidified continuous glass band 24a which is transported to an annealing lehr 46 via a transport roller 44. The transport roller 44 is typically of the cooling type, with the continuous glass band 24a being displaced within the annealing lehr via internal rollers 48 and exiting from the annealing lehr at a temperature of approximately 200° C. After cooling to room temperature on an open roller track depicted as transport roller 50, the continuous glass band is transported through a glass cutting station 52. The cutting station 52 includes at least one cutting element 54 for cutting the continuous glass band 24a into a plurality of sections 24b, each of which forms a flat glass faceplate for use in a color CRT having a flat tensioned shadow mask. The glass faceplates thus produced retain the fire polish of crown glass and vertically drawn sheet glass and possess a degree of flatness and parallelism which closely approaches that of glass produced by the more costly grinding and polishing processes.

The individual sections 24b of the cut-up glass band are then subjected to various operations to put them in condition for use as a faceplate in a CRT. For example, each rectangular glass section may have its four corners rounded such as by grinding. In addition, the edges of each glass section would typically be ground smooth to remove irregularities for facilitating handling of the faceplate and attaching it to the front, open end of a CRT funnel. In another embodiment, the individual faceplates may be formed by rough cutting of the glass band into rectangular sections which are not subjected to further processing before incorporation in a video display.

Referring to FIG. 2, there is shown a color CRT 120 having a front assembly 122 including a tensioned metal foil shadow mask 150 and a flat glass faceplate 124 in accordance with the present invention. The color CRT 120 also includes a funnel 132, to the forward edge portion of which is securely mounted the front assembly 122. As in the case of the flat faceplate 124, the funnel 132 is also comprised of glass, with the enclosed structure thus formed evacuated by conventional means (not shown) after various electronic components are positioned therein and the structure is then sealed. Positioned within the neck portion 166 of the funnel 132 is an in-line electron gun 168 which is aligned with the anterior-posterior axis of the CRT designated by the numeral 156. The in-line electron gun 168 emits a plurality of electron beams 170, 172 and 174 which are directed through apertures 152 in the tensioned metal foil shadow mask 150 which is closely spaced relative to the inner surface 126 of the flat faceplate 124. A magnetic deflection yoke 176 is positioned about the funnel's neck 166. Horizontal and vertical deflection currents are provided to the magnetic deflection yoke 176 for deflecting the three electron beams in a timed manner across the CRT's flat faceplate 124.

A high voltage electron accelerating potential is applied from a power supply (not shown) via a conductor 164 to an anode button 162 on the CRT's funnel 132. The anode button 162 extends through the CRT's funnel 132 and is in electronic contact with an internal conductive coating 160 on the inner surface of the funnel 132. A contact spring 178 is electrically coupled to the internal conductive coating 160 and is further coupled to the metal foil shadow mask 150 such as by means of weldments. Electrical contact is also established between the metal foil shadow mask 150 and a metal cap (not shown) on each of four rails 148 which are used for mounting and positioning the metal foil shadow mask within the CRT 120. Disposed on the inner surface of the CRT's glass faceplate 124 is a film of reflective and electrically conductive aluminum 130. Mounted to the faceplate and positioned between the reflective and conductive aluminum film 130 and the flat tension shadow mask 150 is a phosphor screen 128 responsive to electrons incident thereon for emitting light in forming a video image.

As described above, the flat tension shadow mask 150 includes a plurality of apertures which are illustrated in greatly enlarged size in FIG. 2. The shadow mask support structure is generally rectangular in shape and is comprised of four elongated, linear members 148, each of which is coupled at one end thereof to another elongated, linear support structure element. The shadow mask structure 148 is typically comprised of steel, such as stainless or a rolled steel, but may also be comprised of a ceramic material, and is affixed to the inner surface of the CRT's faceplate 124 by means of a glass sealing frit cement which is heated to its annealing temperature during manufacture of the CRT's front assembly 122. The flat tension shadow mask 150 is securely attached to the aft surfaces of the four shadow mask support structures 148 by tack welding the flat tension shadow mask around its periphery. Where the shadow mask support structure 148 is comprised of a ceramic material, the flat tension shadow mask 150 may be affixed to the support structure by means of a glass sealing frit cement as previously described with respect to the mounting of the shadow mask support structure 148 to the CRT's faceplate 124. FIG. 2 is shown for illustrative purposes only and does not represent a limitation of the present invention as the flat glass faceplate of the present invention may be incorporated in a color CRT in various ways and may have a shadow mask support structure affixed to it in various mounting arrangements. Moreover, the flat glass faceplate of the present invention is not limited to use in a color CRT, but may equally as well be used in a black-and-white CRT.

As shown in FIG. 2, in a typical color CRT having a flat faceplate 124, the forward edge portion of the funnel 132 is affixed to the rear edge portion of the flat faceplate 124 in a sealed manner. The dimensions of the flat faceplate 124 are typically such that its periphery extends beyond the front edge portion of the CRT's funnel 132 so as to provide a lip which extends beyond the funnel's periphery. This outer lip of the flat faceplate 124 comprised of its peripheral edge portion facilitates secure mounting of the CRT's funnel 132 to the inner surface of the faceplate by means of a frit sealing cement to allow the interior of the CRT to be evacuated. Thus, a flat glass faceplate 124 made in accordance with the principles of the present invention would not have to be precisely sized with respect to the CRT's funnel dimensions in order to permit secure coupling of the faceplate and funnel in a sealed manner. As used in a CRT, the thickness of the flat faceplate would typically range from 0.25 inch to 1 inch, with the faceplate's thickness determined primarily by structural strength requirements for a given tube size and X-ray absorption criteria. Its length and width would, of course, be determined by the size of the video display in which it is incorporated.

There has thus been shown a self-polished color CRT flat glass faceplate, and method of fabrication therefor, which represents a low cost approach to the manufacture of color CRTs having a flat faceplate and a metal foil shadow mask maintained in a stretched condition under high tension. The self-polished surfaces of a CRT flat faceplate formed in accordance with the present invention eliminate the conventional steps of polishing and acid etching of the faceplate. The flat faceplate may be cut from a larger float glass section without requiring special shaping or edging procedures because of the manner in which the flat faceplate interfaces with and is mounted to the CRT's funnel.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A low cost color CRT front assembly for mounting to and positioning around a forward edge of a funnel having an open front, said assembly comprising:

a self-polished flat faceplate having a float glass composition, wherein said float glass flat faceplate is characterized as having first and second spaced optically smooth surfaces formed without grinding or polishing of said faceplate and a peripheral edge portion with the forward edge of the funnel coupled in a sealed manner to the first surface of said flat faceplate about the peripheral edge portion thereof, and wherein the peripheral edge portion of said flat faceplate extends beyond the funnel's periphery to facilitate secure mounting of said flat faceplate on the funnel and eliminate the requirement for precisely matching the size of said flat faceplate with the dimensions of the front of the funnel;

a phosphor screen deposited upon a first surface of said faceplate;

a metal foil shadow mask; and support means for affixing said shadow mask to said flat faceplate and for maintaining said shadow mask in a stretched condition under high tension.

2. A low cost color CRT front assembly as in claim 1 wherein said flat faceplate is 0.25 inch to 1 inch in thickness 3. A low cost color CRT front assembly for mounting to and positioning around a forward edge of a funnel having an open front, said assembly comprising:

a self-polished flat faceplate having a float glass composition, wherein said float glass flat faceplate is characterized as having first and second spaced optically smooth surfaces formed without grinding or polishing of said faceplate and a peripheral edge portion with the forward edge of the funnel coupled in a sealed manner to the first surface of said flat faceplate about the peripheral edge portion thereof, and wherein the peripheral edge portion of said flat faceplate extends beyond the funnel's periphery to facilitate secure mounting of said flat faceplate on the funnel and eliminate the requirement for precisely matching the size of said flat faceplate with the dimensions of the front of the funnel;

a phosphor screen deposited upon a first surface of said faceplate;

a metal foil shadow mask; and support means for affixing said shadow mask to said flat faceplate and for maintaining said shadow mask in a stretched condition under high tension, wherein said support means is mounted to the first surface of said flat faceplate for maintaining said shadow mask in closely spaced relation therefrom.

4. A low cost color CRT front assembly as in claim 3 wherein said flat faceplate is generally rectangular and said support means includes a generally rectangular frame attached to said flat faceplate adjacent to a peripheral edge thereof.

5. A low cost color CRT front assembly for mounting to and positioning around a forward edge of a funnel having an open front, said assembly comprising:

- a self-polished flat faceplate having a float glass composition, wherein said float glass flat faceplate is characterized as having first and second spaced optically smooth surfaces formed without grinding or polishing of said faceplate and a peripheral edge portion with the forward edge of the funnel coupled in a sealed manner to the first surface of said flat faceplate about the peripheral edge portion thereof, and wherein the peripheral edge portion of said flat faceplate extends beyond the funnel's periphery to facilitate secure mounting of said flat faceplate on the funnel and eliminate the requirement for precisely matching the size of said flat faceplate with the dimensions of the front of the funnel;
- a phosphor screen deposited upon a first surface of said faceplate;
- a metal foil shadow mask;
- support means for affixing said shadow mask to said flat faceplate and for maintaining said shadow mask in a stretched condition under high tension; and
- a reflective and electrically conductive film of aluminum disposed on the first surface of said faceplate between said phosphor screen and said faceplate.

* * * * *